US012684609B2

(12) United States Patent
Fan et al.

(10) Patent No.: US 12,684,609 B2
(45) Date of Patent: Jul. 14, 2026

(54) DEVICE AND METHOD FOR HANDLING LOW LATENCY TRANSMISSION

(71) Applicant: Realtek Semiconductor Corp., HsinChu (TW)

(72) Inventors: Wei-Kang Fan, HsinChu (TW); Ling-Fan Yeh, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 346 days.

(21) Appl. No.: 18/144,237

(22) Filed: May 7, 2023

(65) Prior Publication Data

US 2024/0015782 A1     Jan. 11, 2024

(30) Foreign Application Priority Data

Jul. 6, 2022     (TW) .................................. 111125366

(51) Int. Cl.
*H04W 72/56*          (2023.01)
*H04W 72/1263*        (2023.01)

(52) U.S. Cl.
CPC ....... *H04W 72/56* (2023.01); *H04W 72/1263* (2013.01)

(58) Field of Classification Search
None
See application file for complete search history.

(56) References Cited

U.S. PATENT DOCUMENTS

| | | | |
|---|---|---|---|
| 2014/0355584 A1* | 12/2014 | Fink ........................ | H04W 4/08 370/338 |
| 2017/0325255 A1* | 11/2017 | Xu ........................... | H04L 43/00 |
| 2020/0389429 A1 | 12/2020 | Shribman | |
| 2021/0120454 A1* | 4/2021 | Chennichetty ....... | H04B 7/0452 |
| 2023/0239742 A1* | 7/2023 | Catalan Cid ........... | H04L 47/38 370/235 |
| 2025/0048428 A1* | 2/2025 | Lou ................... | H04W 74/0816 |

FOREIGN PATENT DOCUMENTS

EP          2 485 436 A1      8/2012

* cited by examiner

*Primary Examiner* — Jae Y Lee
*Assistant Examiner* — Nam P. Cao
(74) *Attorney, Agent, or Firm* — Winston Hsu

(57) ABSTRACT

A controlling device for handling a low latency transmission includes: a storage module, for maintaining a list, wherein the list includes a plurality of transmission information of a plurality of transmitting devices, and the plurality of transmission information includes a plurality of statuses, a plurality of priorities and a plurality of airtime resources, wherein each of the plurality of priorities indicates a priority level of a plurality of priority levels; and a scheduling module, coupled to the storage module, for generating a high priority window, and selecting a transmitting device from the plurality of transmitting devices in the high priority window according to the plurality of statuses, the plurality of priorities and the plurality of airtime resources to control the transmitting device to perform a transmission.

14 Claims, 6 Drawing Sheets

DEVICE AND METHOD FOR HANDLING LOW LATENCY TRANSMISSION

BACKGROUND OF THE INVENTION

1. Field of the Invention

The present invention relates to a device and a method used in a communication system, and more particularly, to a device and a method for handling low latency transmission.

2. Description of the Prior Art

In a communication system, a transmitting device may be connected to a controlling device to wait for a transmission opportunity. The controlling device may schedule the transmission according to a priority of the transmitting device to satisfy a requirement of a low latency transmission. When multiple transmitting devices have high priorities, however, the controlling device schedules the multiple transmitting devices according to their relative priorities, which offsets the benefits of priority, meaning that the requirement of low latency transmission cannot be satisfied.

SUMMARY OF THE INVENTION

The present invention therefore provides a controlling device and controlling method for handling a low latency transmission to solve the abovementioned problem.

A controlling device for handling a low latency transmission comprises: a storage module, for maintaining a list, wherein the list comprises a plurality of transmission information of a plurality of transmitting devices, and the plurality of transmission information comprises a plurality of statuses, a plurality of priorities and a plurality of airtime resources, wherein each of the plurality of priorities indicates a priority level of a plurality of priority levels; and a scheduling module, coupled to the storage module, for generating a high priority window, and selecting a transmitting device from the plurality of transmitting devices in the high priority window according to the plurality of statuses, the plurality of priorities and the plurality of airtime resources to control the transmitting device to perform a transmission.

A controlling method for handling a low latency transmission comprised: maintaining a list, wherein the list comprises a plurality of transmission information of a plurality of transmitting devices, and the plurality of transmission information comprises a plurality of statuses, a plurality of priorities and a plurality of airtime resources, wherein each of the plurality of priorities indicates a priority level of a plurality of priority levels; and generating a high priority window, and selecting a transmitting device from the plurality of transmitting devices in the high priority window according to the plurality of statuses, the plurality of priorities and the plurality of airtime resources to control the transmitting device to perform a transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
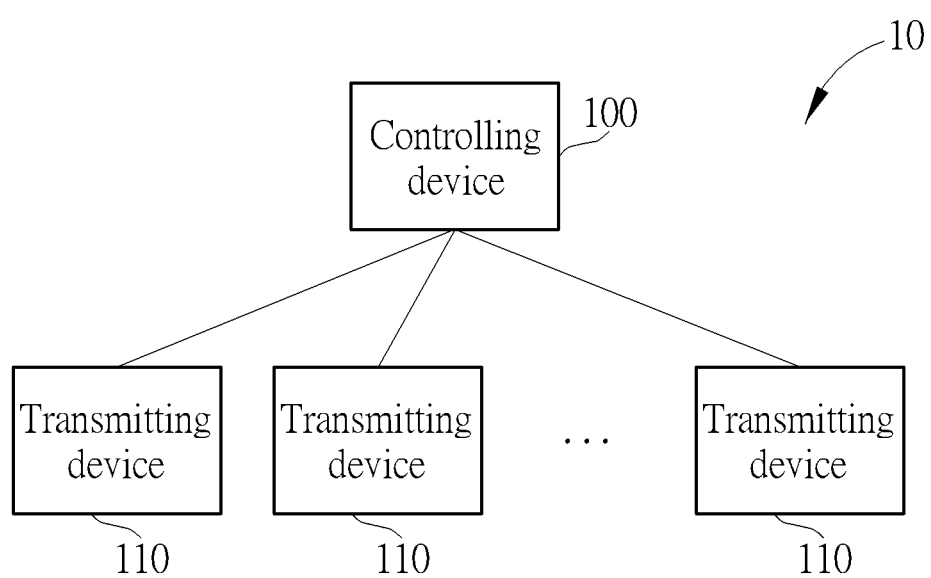
FIG. 1 is a schematic diagram of a communication system according to an example of the present invention.

FIG. 1 is a schematic diagram of a communication system 10 according to an example of the present invention. In FIG. 1, a controlling device 100 and a plurality of transmitting devices 110 are utilized for illustrating the structure of the wireless communication system 10. In one example, the communication system may be a wireless local area network (WLAN), a Digital Video Broadcasting (DVB) system, a Long Term Evolution (LTE) system, a LTE-advanced (LTE-A) system, a 5th generation (5G) system or its subsequent version system, etc., and not limited herein. In one example, the controlling device 100 may be an access point (AP) in the WLAN, and the plurality of transmitting devices 110 may be stations (STAs) in the WLAN. In one example, the controlling device 100 may be realized via a device such as a mobile phone, a notebook computer or a server. In one example, the plurality of transmitting devices 110 may be realized via a device such as an electric toy rocker, a mobile phone or a notebook computer. In one example, the controlling device 100 and the plurality of transmitting devices 110 may support an Institute of Electrical and Electronics Engineers (IEEE) 802.11 standard, wherein the IEEE 802.11 standard may support an Orthogonal Frequency Division Multiple Access (OFDMA) and/or a Multi-User Multiple-Input Multiple-Output (MU-MIMO).

The controlling device 100 may store a plurality of transmission information of the plurality of transmitting devices 110 in a list or a queue to control respective transmissions of the plurality of transmitting devices 110. In one example, the queue may comprise at least one queue of an access category (AC) queue (e.g. a voice (VO) queue, a video (VI) queue, a best effort (BE) queue and a background (BK) queue) or at least one high priority queue.

Figure 2:
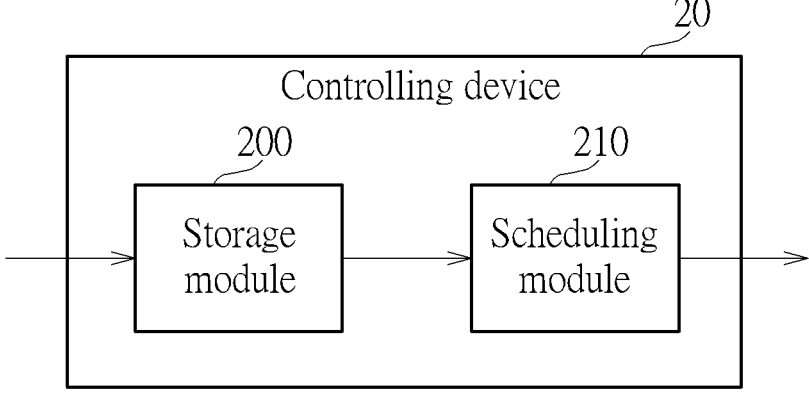
FIG. 2 is a schematic diagram of a controlling device according to an example of the present invention.

FIG. 2 is a schematic diagram of a controlling device 20 according to an example of the present invention. The controlling device 20 may realize the controlling device 100 in FIG. 1, and is for handing a low latency transmission of a plurality of transmitting devices (e.g. the plurality of transmitting devices 110). The controlling device 20 may comprise a storage module 200 and a scheduling module 210. The storage module 200 is for maintaining (e.g. storing) a list, wherein the list comprises a plurality of transmission information of the plurality of transmitting devices, and the plurality of transmission information comprises a plurality of statuses, a plurality of priorities and a plurality of airtime resources. Each of the plurality of priorities indicates a priority level of a plurality of priority levels (e.g. of the transmissions). The scheduling module 210 is coupled to the storage module 200, and is for generating a high priority window and selecting a transmitting device from the plurality of transmitting devices in the high priority window according to the plurality of statuses, the plurality of priorities and the plurality of airtime resources to control the transmitting device to perform a transmission. The controlling device 20 selects the transmitting device to perform the transmission by considering the high priority window, the plurality of statuses, the plurality of priorities and the plurality of airtime resources.

In one example, a status may indicate (e.g. be) normal (e.g. transmittable) or abnormal (e.g. non-transmittable). In one example, a priority level may comprise (e.g. be) a high priority, a low priority or any other priority between the high priority and the low priority.

In one example, the controlling device 20 may further comprise a processing module (not shown in FIG. 2). The processing module is coupled to the storage module 200, and is for configuring the plurality of airtime resources to the plurality of transmitting devices (e.g. periodically). In one example, the processing module may generate the plurality of airtime resources according to at least one of a number of the plurality of transmitting devices, a plurality of capabilities, a plurality of data throughputs, a plurality of sensitivities for latency or other suitable parameters. In one example, the processing module may generate at least one of the plurality of data throughputs, the plurality of sensitivities for latency or other suitable parameters according to at least one of the number of the plurality of transmitting devices or a plurality of capabilities. In one example, the plurality of airtime resources may be the same or different. In one example, the controlling device 20 may further comprise a receiving module (not shown in FIG. 2). The receiving module is coupled to the storage module 200, and is for obtaining (e.g. receiving) the plurality of priorities from the plurality of transmitting devices.

In one example, the high priority window may comprise (e.g. be) a time interval, such as 10 millisecond (ms), but is not limited herein. In one example, the scheduling module 210 may generate the high priority window according to a requirement (e.g. the number) of high priority transmitting device(s) among the plurality of transmitting devices. In one example, the high priority window may be generated via a module (s) related to a Medium Access Control (MAC) transmission timing (not shown in FIG. 2).

In one example, the step of the scheduling module 210 selecting the transmitting device from the plurality of transmitting devices according to the plurality of statuses, the plurality of priorities and the plurality of airtime resources comprises: the scheduling module 210 determines whether the plurality of transmitting devices have a high priority according to the plurality of priorities to generate a first determination result, when the plurality of statuses indicates that the plurality of transmitting devices is able to perform a plurality of transmissions. Then, the scheduling module 210 obtains a first maximum airtime resource of at least one airtime resource corresponding to at least one transmitting device of the plurality of transmitting devices and selects the transmitting device corresponding to the first maximum airtime resource from the at least one transmitting device, when the first determination result indicates that the at least one transmitting device has the high priority. The scheduling module 210 obtains a second maximum airtime resource of the plurality of airtime resources and selects the transmitting device corresponding to the second maximum airtime resource from the plurality of transmitting devices, when the first determination result indicates that the plurality of transmitting devices does not have the high priority. That is, the scheduling module 210 selects the transmitting device with the largest airtime resource from a plurality of transmitting devices with the high priority whose statuses indicate that the transmission can be performed, to control the transmitting device to perform the transmission. The scheduling module 210 does not select the transmitting device with the largest airtime resource from a plurality of transmitting devices with the high priority whose statuses indicate that the transmission cannot be performed.

In one example, the scheduling module 210 may determine whether the transmitting device comprises data to be transmitted to generate a second determination result, after obtaining (or selecting) the transmitting device to perform the transmission. Then, the scheduling module 210 may generate a remaining airtime resource according to an actual airtime of the transmission and an airtime resource corresponding to the transmitting device and may update the airtime resource of the list according to the remaining airtime resource, when the second determination result indicates that the transmitting device comprises the data to be transmitted. The scheduling module 210 may delete (or ignore) the transmission information corresponding to the transmitting device in the list, when the second determination result indicates that the transmitting device does not comprise the data to be transmitted. In one example, the scheduling module 210 may delete (or ignore) the transmission information corresponding to the transmitting device in the list, when determining that the transmitting device is out of a coverage range of the controlling device 20. In one example, the scheduling module 210 or the transmitting device may generate the remaining airtime resource as the airtime resource minus the actual airtime. In one example, the airtime resource or the remaining airtime resource may be a negative value.

In one example, the scheduling module 210 may ignore the transmission information corresponding to the transmitting device in the list in the high priority window, after obtaining (or selecting) the transmitting device to perform the transmission. In one example, the scheduling module 210 may mask the transmission information corresponding to the transmitting device by using a mask to realize the above operation of ignoring the transmission information corresponding to the transmitting device in the list.

Figure 3:
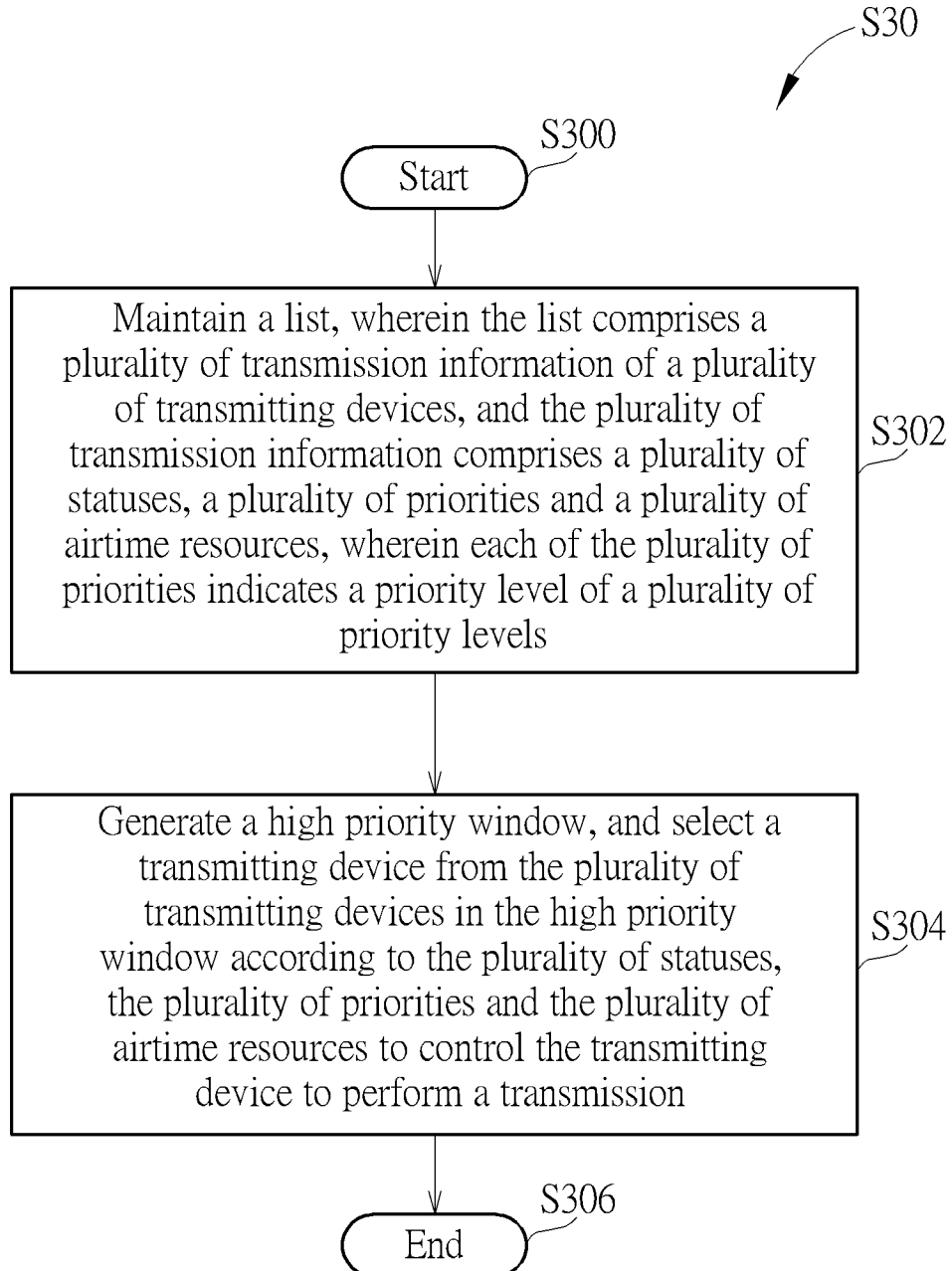
FIG. 3 is a flowchart of a process according to an example of the present invention.

Operations of the controlling device 20 in the above examples can be summarized into a process S30 shown in FIG. 3. The process S30 includes the following steps:

Step S300: Start.

Step S302: Maintain a list, wherein the list comprises a plurality of transmission information of a plurality of transmitting devices, and the plurality of transmission information comprises a plurality of statuses, a plurality of priorities and a plurality of airtime resources, wherein each of the plurality of priorities indicates a priority level of a plurality of priority levels.

Step S304: Generate a high priority window, and select a transmitting device from the plurality of transmitting devices in the high priority window according to the plurality of statuses, the plurality of priorities and the plurality of airtime resources to control the transmitting device to perform a transmission.

Step S306: End.

Detailed description and variations of the process S30 can be known by referring to the previous description, and are not narrated herein.

Figure 4:
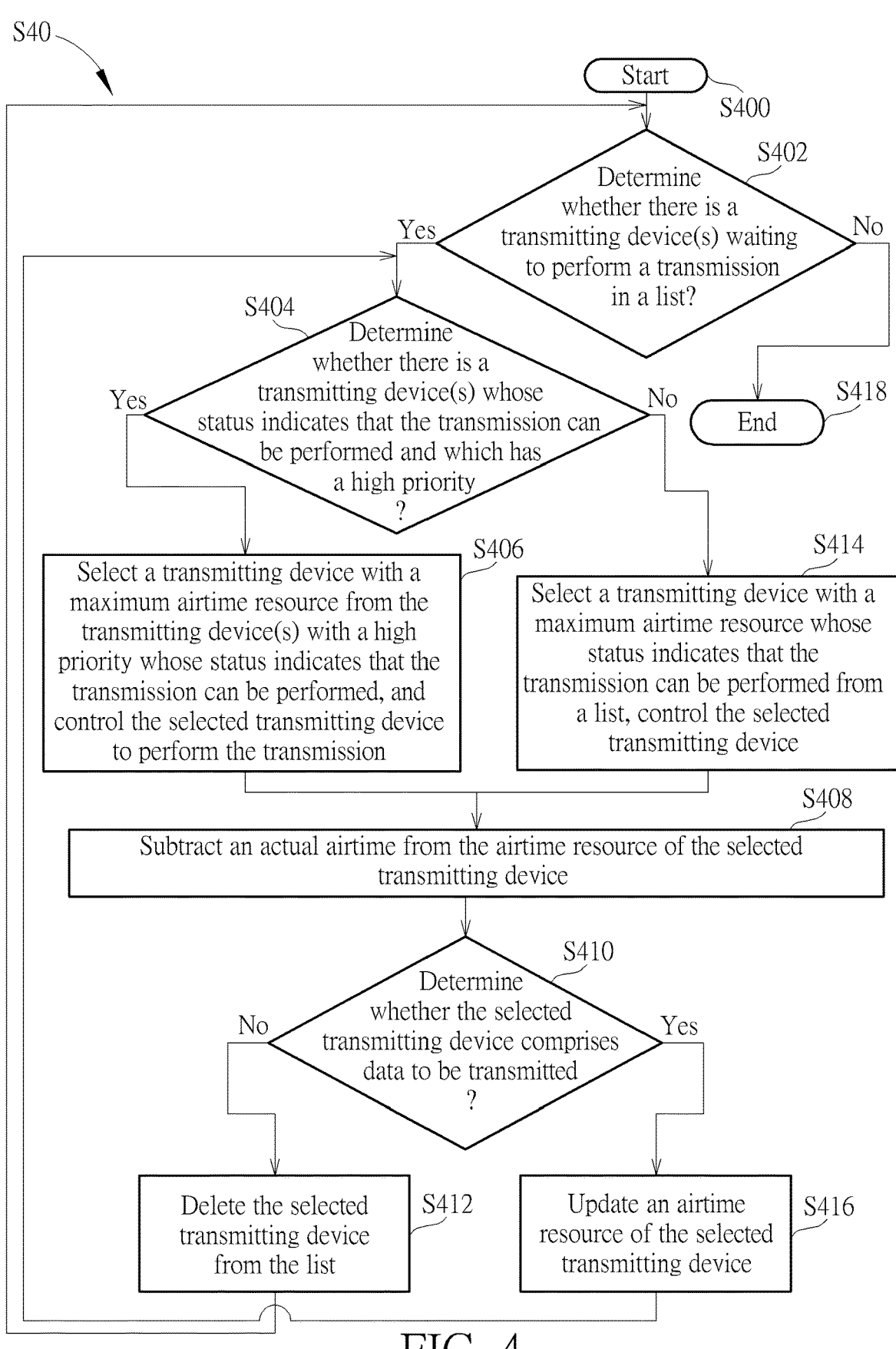
FIG. 4 is a flowchart of a process according to an example of the present invention.

FIG. 4 is a flowchart of a process S40 according to an example of the present invention.

Step S400: Start.

Step S402: Determine whether there is a transmitting device(s) waiting to perform a transmission in a list (or a queue). If yes, perform Step S404. If no, perform Step S418.

Step S404: Determine whether there is a transmitting device(s) whose status indicates that the transmission can be performed and which has a high priority. If yes, perform Step S406. If no, perform Step S414.

Step S406: Select a transmitting device with a maximum airtime resource from the transmitting device (s) with a high priority whose status indicates that the transmission can be performed, and control the selected transmitting device to perform the transmission.

Step S408: Subtract an actual airtime from the airtime resource of the selected transmitting device.

Step S410: Determine whether the selected transmitting device comprises data to be transmitted. If yes, perform Step S416. If no, perform Step S412.

Step S412: Delete the selected transmitting device from the list, and return to Step S402.

Step S414: Select a transmitting device with a maximum airtime resource whose status indicates that the transmission can be performed from a list, control the selected transmitting device, and perform Step S408.

Step S416: Update an airtime resource of the selected transmitting device, and perform Step S404.

Step S418: End.

Detailed description and variations of the process S40 can be known by referring to the previous description, and are not narrated herein.

Figure 5:
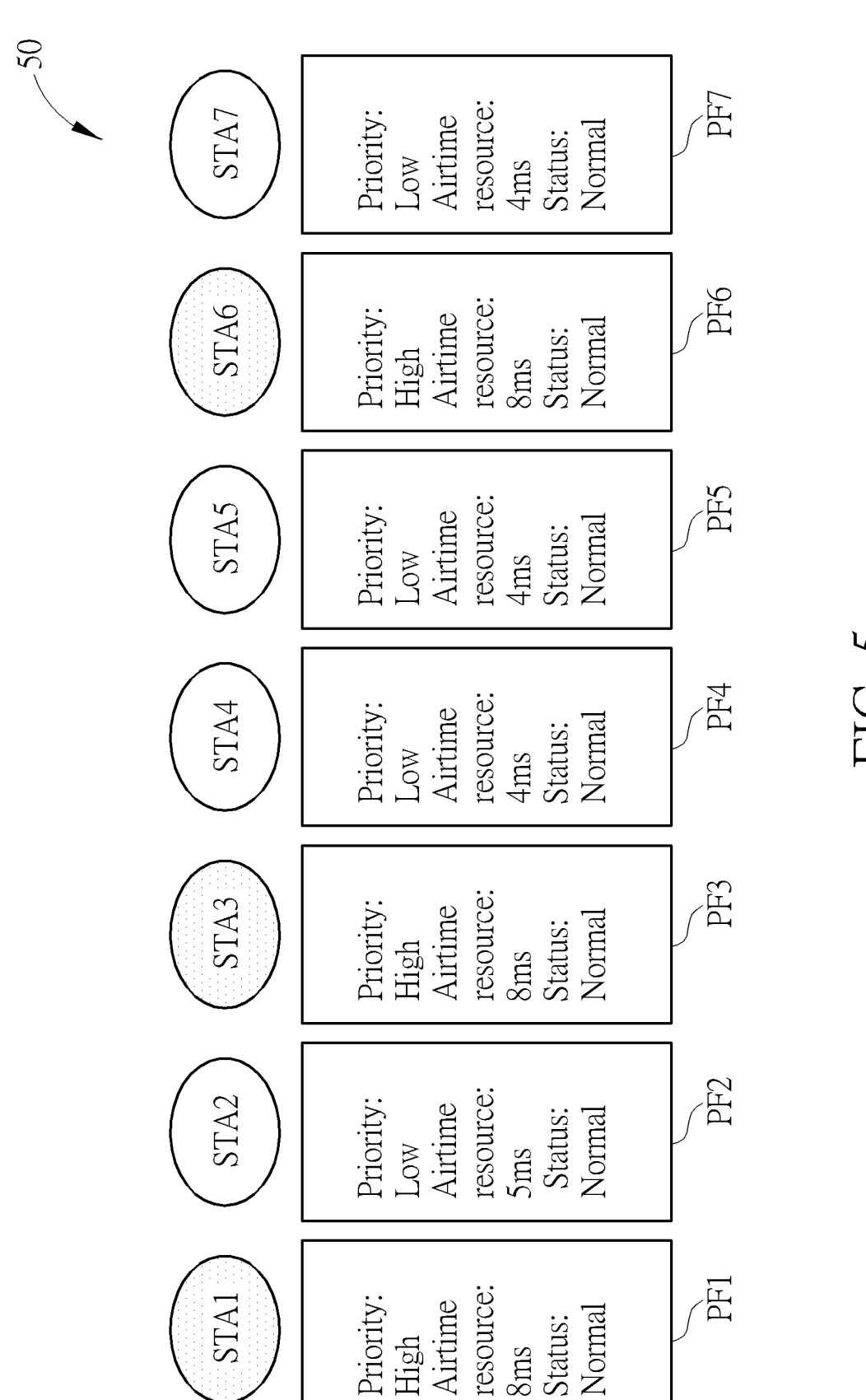
FIG. 5 is a schematic diagram of a list according to an example of the present invention.

FIG. 5 is a schematic diagram of a list 50 according to an example of the present invention. The list 50 comprises a plurality of transmission information PF1~PF7 of a plurality of transmitting devices STAT-STAT. As shown in FIG. 5, in the list 50, the transmission information PF1 comprises a high priority, an airtime resource of 8 ms and a normal (e.g. transmittable) status. The transmission information PF3 and PF6 comprise the same information as the transmission information PF1. In addition, the transmission information PF2 comprises a low priority, an airtime resource of 5 ms and a normal status. The transmission information PF4 comprises a low priority, an airtime resource of 4 ms and a normal status. The transmission information PF5 and PF7 comprise the same information as the transmission information PF4. The transmitting devices STA1, STA3 and STA6 with the high priority are shown as dots for brevity.

Figure 6:
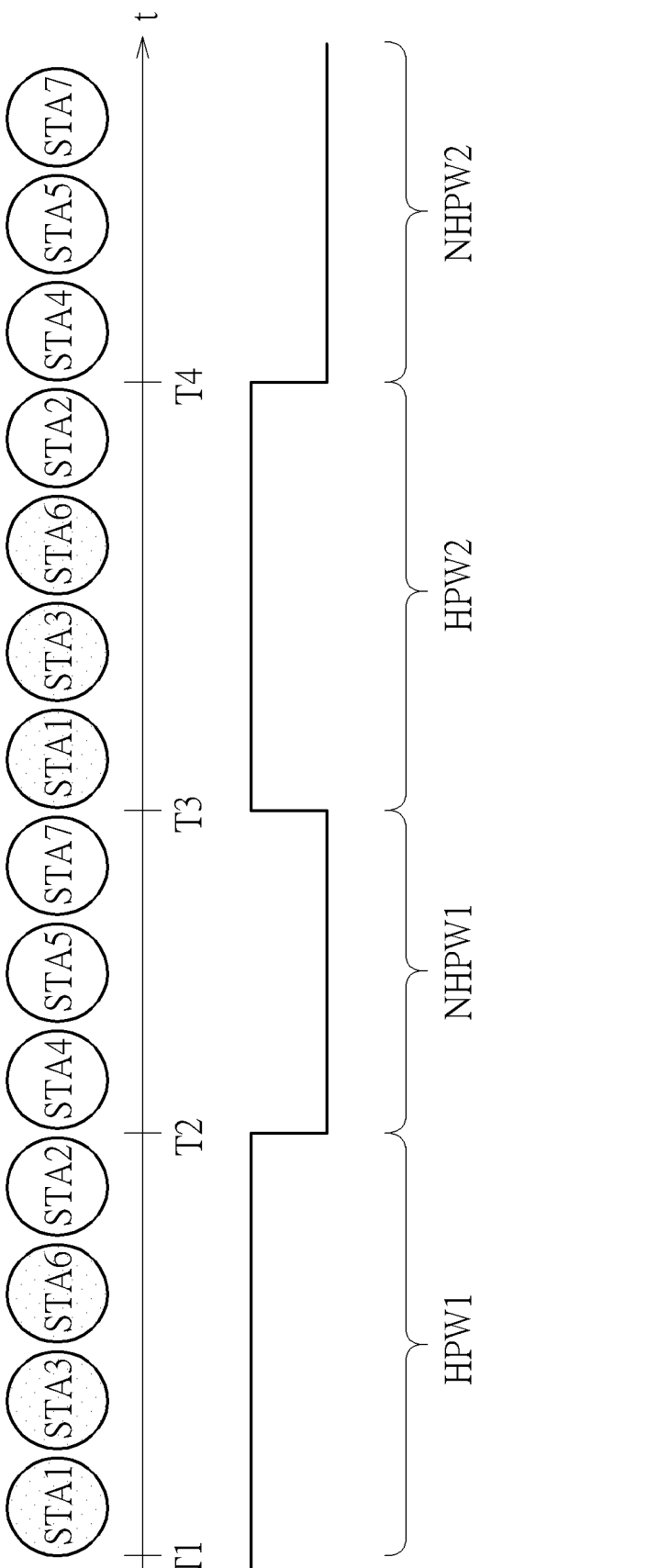
FIG. 6 is a schematic diagram of a controlling device controlling a plurality of transmitting devices to perform a transmission according to an example of the present invention.

FIG. 6 is a schematic diagram of a controlling device 20 controlling a plurality of transmitting devices (e.g. the plurality of transmitting devices in FIG. 1) to perform a transmission according to an example of the present invention, and may be used to illustrate FIGS. 1-5. FIG. 6 shows a plurality of transmitting devices STAT-STAT corresponding to the plurality of transmitting devices STAT-STAT in FIG. 5. In addition, FIG. 6 shows a time domain t, time instants T1-T4, high priority windows HPW1 and HPW2 and non-high priority windows NHPW1 and NHPW2. The high priority windows HPW1 and HPW2 are 10 ms.

As shown in FIG. 6, the controlling device 20 obtains a normal status, a high priority and an airtime resource of 8 ms for the transmitting devices STA1, STA3 and STA6 according to the list 50, when entering the high priority window HPW1 (e.g. the time instant T1). The transmitting devices STA1, STA3 and STA6 have the maximum airtime resource. Thus, the controlling device 20 selects any one of the transmitting devices STA1, STA3 and STA6 with the maximum airtime resource, such as the transmitting device STA1, to control the transmitting device STA1 to perform a transmission. In the transmission, an actual airtime of the transmitting device STA1 is 2 ms. Thus, the controlling device 20 determines that a remaining airtime resource of the transmitting device STA1 is 6 ms, and updates the airtime resource of the transmitting device STA1 in the list 50. The operations of the controlling device 20 controlling the transmitting devices STA3 and STA6 to perform the transmission are similar to the operations of the controlling device 20 controlling the transmitting device STA1 to perform the transmission, and not narrated herein. Then, the controlling device 20 determines that the transmitting device STA2 has the maximum airtime resource of 5 ms among the transmitting devices STA2, STA4, STA5 and STA7 other than the transmitting devices STA1, STA3 and STA6. Thus, the controlling device 20 selects the transmitting device STA2 to control the transmitting device STA2 to perform the transmission. In the transmission, an actual airtime of the transmitting device STA2 is 1 ms. Thus, the controlling device 20 determines that a remaining airtime resource of the transmitting device STA2 is 4 ms, and updates the airtime resource of the transmitting device STA2 in the list 50.

The controlling device 20 determines that the transmitting devices STA1, STA2, STA3 and STA6 have performed the transmission and determines that the transmitting devices STA1, STA2, STA3 and STA6 have data to be transmitted, when entering the non-high priority window NHPW1 (e.g. the time instant T2). In addition, the controlling device 20 determines that the transmitting devices STA4, STA5 and STA7 have the same airtime resource among the transmitting devices STA4, STA5 and STA7 other than the transmitting devices STA1, STA2, STA3 and STA6, i.e., the transmitting devices STA4, STA5 and STA7 have the maximum airtime resource. Thus, the controlling device 20 selects any one of the transmitting devices STA4, STA5 and STA7, such as the transmitting device STA4, to control the transmitting device STA4 to perform the transmission. In the transmission, an actual airtime of the transmitting device STA4 is 1 ms. Thus, the controlling device 20 determines that a remaining airtime resource of the transmitting device STA4 is 3 ms, and updates the airtime resource of the transmitting device STA4 in the list 50. The operations of the controlling device 20 controlling the transmitting devices STA5 and STA7 to perform the transmission are similar to the operations of the controlling device 20 controlling the transmitting device STA4 to perform the transmission, and not narrated herein.

The controlling device 20 performs similar operations according to the list 50 in the cases of entering the high priority window HPW2 (e.g. the time instant T3) and entering the high priority window HPW1, to control the transmitting devices STA1, STA3, STA6 and STA2 and update the airtime resource of the transmitting devices STA1, STA3, STA6 and STA2 in the list 50. The controlling device 20 performs the similar operations in the cases of entering the non-high priority window NHPW2 (e.g. the time instant T4) and entering the non-high priority window NHPW1, to control the transmitting devices STA4, STA5 and STA7 and update the airtime resource of the transmitting devices STA4, STA5 and STA7 in the list 50. The controlling device 20 may continue to perform the above operations until the controlling device 20 determines that the list 50 does not comprise any transmitting device with the normal state and the high priority or does not have any transmission device with a pending transmission.

Figure 7:
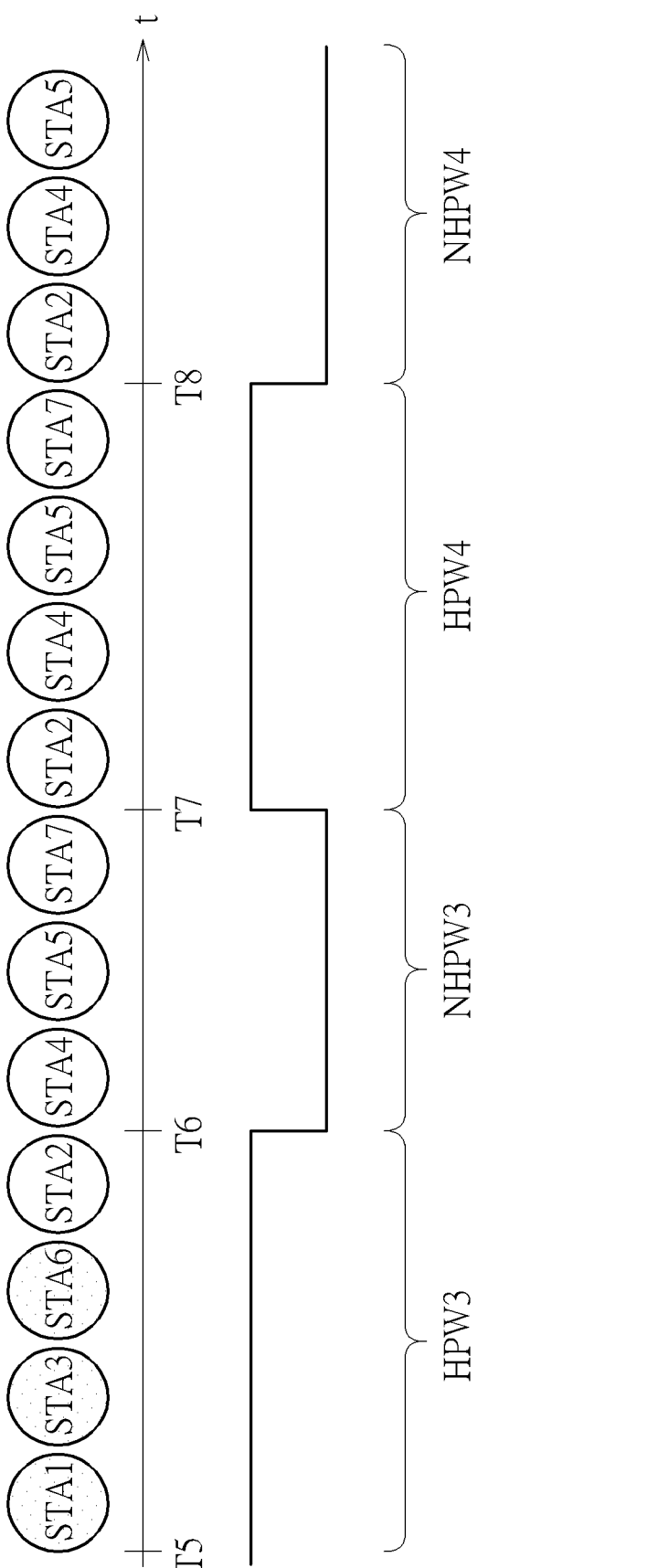
FIG. 7 is a schematic diagram of a controlling device controlling a plurality of transmitting devices to perform a transmission according to an example of the present invention.

FIG. 7 is a schematic diagram of a controlling device 20 controlling a plurality of transmitting devices (e.g. the plurality of transmitting devices in FIG. 1) to perform a transmission according to an example of the present invention, and may be used to illustrate FIGS. 1-5. FIG. 7 shows a plurality of transmitting devices STAT-STAT corresponding to the plurality of transmitting devices STAT-STAT in FIG. 5. In addition, FIG. 7 shows a time domain t, time instants T5-T8, high priority windows HPW3 and HPW4 and non-high priority windows NHPW3 and NHPW4. The high priority windows HPW3 and HPW4 are 10 ms.

As shown in FIG. 7, the controlling device 20 performs similar operations according to the list 50 in the cases of entering the high priority window HPW3 (e.g. the time instant T5) and entering the high priority window HPW1 (shown in FIG. 6). The controlling device 20 determines that the transmitting devices STA1, STA3, STA6 and STA2 have performed the transmission, and determines that the transmitting devices STA1, STA3 and STA6 do not comprise the data to be transmitted and the transmitting device STA2 comprises the data to be transmitted, when entering the non-high priority window NHPW3 (e.g. the time instant T6). Thus, the controlling device 20 deletes (or masks) the transmission information PF1, PF3 and PF6 of, respectively, the transmitting devices STA1, STA3 and STA6 in the list 50. Then, the controlling device 20 determines that the transmitting devices STA4, STA5 and STA7 have the same airtime resource among the transmitting devices STA4, STA5 and STA7 other than transmitting device STA2, i.e., the transmitting devices STA4, STA5 and STA7 have the maximum airtime resource. Thus, the controlling device 20 selects the transmitting devices STA4, STA5 and STA7 to respectively control the transmitting devices STA4, STA5 and STA7 to perform the transmission.

The controlling device 20 determines that the transmitting devices STA2, STA4, STA5 and STA7 do not have the high priority according to the list 50, when entering the high priority window HPW4 (e.g. the time instant T7) and the non-high priority window NHPW4 (e.g. the time instant T8). Thus, the controlling device 20 selects the transmitting device STA2 with the maximum airtime resource from the transmitting devices STA2, STA4, STA5 and STA7 to control the transmitting device STA2 to perform the transmission. As shown in FIG. 7, in the subsequent selections, the controlling device 20 selects the transmitting devices STA4, STA5, STA7, STA2, STA4 and STA5 to respectively control the selected transmitting devices to perform the transmission. The controlling device 20 may continue to perform the above operations until the list 50 does not have any transmitting device with a pending transmission.

It should be noted that the values for the high priority window, the number of the transmitting device(s), the airtime resource, the actual airtime and the remaining airtime resource described above are only used to illustrate the embodiments, but do not limit the invention.

The term of "first" and "second" described above are used to distinguish the relevant statements, and do not limit the order of the relevant statements. The operation of "determine" described above may be replaced by the operation of "compute", "calculate", "obtain", "generate" or "output". The operation of "generate" described above may be replaced by the operation of "compute", "calculate" or "output". The phrase of "according to" described above may be replaced by "via" or "by using". The term of "comprise" described above may be replaced by "be".

It should be noted that realizations of the controlling device 20 or the modules in the controlling device 20 are various. For example, the device mentioned above may be integrated into one or more modules. In addition, the controlling device 20 or the modules in the controlling device 20 may be realized by hardware (e.g. circuits), software, firmware (known as a combination of a hardware device, computer instructions and data that reside as read-only software on the hardware device), an electronic system, a processor (e.g. a central processing unit (CPU)) or a combination of the devices mentioned above, but are not limited herein.

To sum up, the controlling device selects the transmitting device(s) to control the transmitting device(s) to perform the transmission, by considering the high priority window, the plurality of states and the plurality of airtime resource. Thus, the problem in the prior art caused by the control device scheduling multiple transmission devices only according to priority can be improved, and the requirement of low latency transmission can also be satisfied.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controlling device for handling a low latency transmission, comprising:

a storage module, for maintaining a list, wherein the list comprises a plurality of transmission information of a plurality of transmitting devices, and the plurality of transmission information comprises a plurality of statuses, a plurality of priorities and a plurality of airtime resources, wherein each of the plurality of priorities indicates a priority level of a plurality of priority levels; and a scheduling module, coupled to the storage module, for generating a high priority window, and selecting a transmitting device from the plurality of transmitting devices in the high priority window according to the plurality of statuses, the plurality of priorities and the plurality of airtime resources to control the transmitting device to perform a transmission;

wherein the step of selecting the transmitting device from the plurality of transmitting devices according to the plurality of statuses, the plurality of priorities and the plurality of airtime resources comprises:

determining whether the plurality of transmitting devices have a high priority according to the plurality of priorities to generate a first determination result, when the plurality of statuses indicate that the plurality of transmitting devices is able to perform a plurality of transmissions;

obtaining a first maximum airtime resource of at least one airtime resource corresponding to at least one transmitting device of the plurality of transmitting devices and selecting the transmitting device corresponding to the first maximum airtime resource from the at least one transmitting device, when the first determination result indicates that the at least one transmitting device has the high priority; and obtaining a second maximum airtime resource of the plurality of airtime resources and selecting the transmitting device corresponding to the second maximum airtime resource from the plurality of transmitting devices, when the first determination result indicates that the plurality of transmitting devices do not have the high priority;

wherein the scheduling module further performs the following steps:

determining whether the transmitting device comprises data to be transmitted to generate a second determination result, after obtaining the transmitting device to perform the transmission;

generating a remaining airtime resource according to an actual airtime of the transmission and an airtime resource corresponding to the transmitting device and updating the airtime resource of the list according to the remaining airtime resource, when the second determination result indicates that the transmitting device comprises the data to be transmitted; and deleting the transmission information corresponding to the transmitting device in the list, when the second determination result indicates that the transmitting device does not comprise the data to be transmitted.

2. The controlling device of claim 1, further comprising:

a processing module, coupled to the storage module, for configuring the plurality of airtime resources to the plurality of transmitting devices.

3. The controlling device of claim 2, wherein the processing module generates the plurality of airtime resources according to at least one of a number of the plurality of transmitting devices or a plurality of capabilities.

4. The controlling device of claim 1, further comprising:

a receiving module, coupled to the storage module, for obtaining the plurality of priorities from the plurality of transmitting devices.

5. The controlling device of claim 1, wherein the high priority window comprises a time interval.

6. The controlling device of claim 1, wherein the scheduling module generates the remaining airtime resource as the airtime resource minus the actual airtime.

7. The controlling device of claim 1, wherein the scheduling module further performs the following step:

ignoring the transmission information corresponding to the transmitting device in the list in the high priority window, after obtaining the transmitting device to perform the transmission.

8. A controlling method for handling a low latency transmission, comprising:

maintaining a list, wherein the list comprises a plurality of transmission information of a plurality of transmitting devices, and the plurality of transmission information comprises a plurality of statuses, a plurality of priorities and a plurality of airtime resources, wherein each of the plurality of priorities indicates a priority level of a plurality of priority levels; and generating a high priority window, and selecting a transmitting device from the plurality of transmitting devices in the high priority window according to the plurality of statuses, the plurality of priorities and the plurality of airtime resources to control the transmitting device to perform a transmission;

wherein the step of selecting the transmitting device from the plurality of transmitting devices according to the plurality of statuses, the plurality of priorities and the plurality of airtime resources comprises:

determining whether the plurality of transmitting devices have a high priority according to the plurality of priorities to generate a first determination result, when the plurality of statuses indicates that the plurality of transmitting devices is able to perform a plurality of transmissions;

obtaining a first maximum airtime resource of at least one airtime resource corresponding to at least one transmitting device of the plurality of transmitting devices and selecting the transmitting device corresponding to the first maximum airtime resource from the at least one transmitting device, when the first determination result indicates that the at least one transmitting device has the high priority; and obtaining a second maximum airtime resource of the plurality of airtime resources and selecting the transmitting device corresponding to the second maximum airtime resource from the plurality of transmitting devices, when the first determination result indicates that the plurality of transmitting devices do not have the high priority; and the controlling method further comprises:

determining whether the transmitting device comprises data to be transmitted, to generate a second determination result, after obtaining the transmitting device to perform the transmission;

generating a remaining airtime resource according to an actual airtime of the transmission and an airtime resource corresponding to the transmitting device and updating the airtime resource of the list according to the remaining airtime resource, when the second determination result indicates that the transmitting device comprises the data to be transmitted; and deleting the transmission information corresponding to the transmitting device in the list, when the second determination result indicates that the transmitting device does not comprise the data to be transmitted.

9. The controlling method of claim 8, further comprising:

configuring the plurality of airtime resources to the plurality of transmitting devices.

10. The controlling method of claim 8, wherein the plurality of airtime resources is generated according to at least one of a number of the plurality of transmitting devices or a plurality of capabilities.

11. The controlling method of claim 8, further comprising:

obtaining the plurality of priorities from the plurality of transmitting devices.

12. The controlling method of claim 8, wherein the high priority window comprises a time interval.

13. The controlling method of claim 8, wherein the remaining airtime resource is generated as the airtime resource minus the actual airtime.

14. The controlling method of claim 8, further comprising:

ignoring the transmission information corresponding to the transmitting device in the list in the high priority window, after obtaining the transmitting device to perform the transmission.

* * * * *